(12) United States Patent
Nishida et al.

(10) Patent No.: US 7,009,918 B2
(45) Date of Patent: Mar. 7, 2006

(54) INFORMATION STORAGE APPARATUS

(75) Inventors: Masatsugu Nishida, Kawasaki (JP); Toru Ikeda, Kawasaki (JP); Masaharu Moritsugu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 09/791,397

(22) Filed: Feb. 22, 2001

(65) Prior Publication Data

US 2002/0031059 A1   Mar. 14, 2002

(30) Foreign Application Priority Data

Jul. 28, 2000   (JP)   ............................. 2000-229691

(51) Int. Cl.
G11B 7/00   (2006.01)
(52) U.S. Cl. .............................. 369/44.28; 369/53.23; 369/44.29; 369/44.26; 369/44.25
(58) Field of Classification Search ............. 369/30.15, 369/44.17, 44.25, 44.27, 44.28, 47.44, 59.14, 369/100, 106, 213, 224, 226, 30.16, 44.26, 369/44.41, 44.29
See application file for complete search history.

(56) References Cited

U.S. PATENT DOCUMENTS

| | | | | |
|---|---|---|---|---|
| 5,084,661 A | * | 1/1992 | Tanaka | 369/44.28 |
| 5,197,058 A | * | 3/1993 | Bell et al. | 369/44.28 |
| 5,721,717 A | * | 2/1998 | Obata et al. | 369/44.27 |
| 5,812,503 A | * | 9/1998 | Minami et al. | 369/44.25 |
| 5,982,722 A | * | 11/1999 | Hashimoto | 369/44.29 |
| 6,014,354 A | * | 1/2000 | Nomura et al. | 369/44.28 |
| 6,044,050 A | * | 3/2000 | Kuroiwa | 369/44.28 |
| RE36,864 E | * | 9/2000 | Kagami et al. | 369/44.28 |
| 6,222,803 B1 | * | 4/2001 | Uemura et al. | 369/44.29 |
| 6,229,772 B1 | * | 5/2001 | Kumagai et al. | 369/44.27 |

FOREIGN PATENT DOCUMENTS

| | | | |
|---|---|---|---|
| EP | 0 749 118 | | 12/1996 |
| JP | 60-101831 | | 7/1985 |
| JP | 03-071439 | | 3/1991 |
| JP | 05036099 | * | 2/1993 |
| JP | 05-197988 | | 8/1993 |
| JP | 6036303 | | 2/1994 |
| JP | 6215389 | | 8/1994 |
| JP | 6259791 | | 9/1994 |
| JP | 06-325394 | | 11/1994 |
| JP | 07110950 | * | 4/1995 |
| JP | 08-307218 | | 11/1996 |
| JP | 09-167360 | | 6/1997 |
| JP | 09-288830 | | 11/1997 |
| JP | 10198971 | * | 7/1998 |
| JP | 11-339286 | | 12/1999 |
| JP | 2001-209949 | | 8/2001 |

* cited by examiner

*Primary Examiner*—Hoa T. Nguyen
*Assistant Examiner*—Jorge L. Ortiz-Criado
(74) *Attorney, Agent, or Firm*—Greer, Burns & Crain, Ltd.

(57) ABSTRACT

The present invention provides an information storage apparatus that generates a tracking error signal based on a detection signal, and performs various control operations based on the tracking error signal. When the operation mode is a seek operation mode, the information storage apparatus generates a tracking error signal by holding the peak value of the detection signal. When the operation mode is a tracking operation mode, the information storage apparatus generates a tracking error signal directly from the detection signal. With this information storage apparatus, stable control operations can be performed, regardless of changes of conditions.

4 Claims, 19 Drawing Sheets

FIG. 10A   TES
FIG. 10B   TES Offset CORRECTION VOLTAGE
FIG. 10C   OFFSET CORRECTION TES
FIG. 10D   MODE CONTROL SIGNAL

FIG. 18

|  | S 1 | S 2 | S 3 | S 4 |
|---|---|---|---|---|
| P 1 | Q | Q | Q | Q |
| P 2 | T | T | Q | Q |
| P 3 | Q | T | Q | Q |
| P 4 | T | Q | Q | Q |

FIG. 19

|     | S 1 | S 2 | S 5    |
|-----|-----|-----|--------|
| P 5 | Q   | Q   | Q or T |
| P 6 | T   | Q   | Q or T |
| P 7 | Q   | T   | Q or T |
| P 8 | T   | T   | Q or T |

INFORMATION STORAGE APPARATUS

BACKGROUND OF THE INVENTION

1. Field of the Invention

The present invention generally relates to information storage apparatuses, and, more particularly, to an information storage apparatus that generates a tracking error signal based on a detection signal, and performs various control operations based on the generated tracking error signal.

2. Description of the Related Art

In an information storage apparatus such as an optical disk apparatus, a tracking error signal is generated based on a detection signal of reflected light. Based on this tracking error signal, tracking control and seek control are performed. In recent years, detection signals have become smaller with higher recording densities. As a result, the stability of the tracking control and seek control may deteriorate.

FIG. 1 is a block diagram of a conventional optical disk apparatus, mainly illustrating the tracking servo system of the optical disk apparatus.

The laser light emitted from a laser diode 110 is supplied to a collimator lens 111. The collimator lens 111 converts the laser light supplied from the laser diode 110 into a collimated beam. The collimated beam passes through a beam splitter 112, and is then supplied to a mirror 113. The mirror 13 reflects the incident light towards an objective lens 114. The objective lens 114 converges the beam from the mirror 113 onto a disk medium 115. The light beam converged onto the disk medium 115 is reflected from the disk medium 115, and then enters the beam splitter 112 via the objective lens 114 and the mirror 113.

The beam splitter 112 reflects the reflected light from the disk medium 115 towards an optical unit 116. The optical unit 116 comprises a Wollaston prism, a Foucault unit, and a detection lens. The optical unit 116 extracts various signal components. Among the extracted signal components, a tracking error signal component is supplied to a photodetector 117 that converts incident light into an electrical signal.

The electrical signal supplied from the photodetector 117 is supplied to a tracking error signal producing circuit 118. A tracking error signal produced by the tracking error signal producing circuit 118 is supplied to low-pass filters 119 and 120. The low-pass filters 119 and 120 remove noise. The tracking error signal from the low-pass filter 119 is supplied to a DSP (Digital Signal Processor) 123. The DSP 123 performs a phase compensation on the tracking error signal outputted from the low-pass filter 119 at the time of a tracking operation.

The tracking error signal outputted from the low-pass filter 120 is supplied to a comparator 121. The comparator 121 digitizes the tracking error signal. The digitized signal from the comparator is supplied to a counter 122 that counts the digitized signal. The counted value outputted from the counter 122 is supplied to the DSP 123.

Based on the counted value supplied from the counter 122 at a time of a seek operation, the DSP 123 detects the number of tracks the beam has traversed, and controls the moving speed of the light beam during the seek operation.

Also, based on the tracking error signal outputted from the low-pass filter 119, the DSP 123 controls a driving circuit 124. The driving circuit 124 drives an actuator 125. The actuator 125 moves the objective lens 114 in the direction of the arrow A, which is the radial direction of the disk medium 115. As the actuator 125 is moved in the direction of the arrow A, the light beam emitted onto the disk medium 115 wobbles in the direction of the arrow A, thereby performing tracking control.

FIG. 2 shows the circuit structure of the conventional tracking error signal producing circuit 118.

The tracking error signal producing circuit 118 comprises NPN transistors Q1 to Q6, resistors R1 and R2, voltage sources 131 and 132, a current source 133, and a differential amplifier circuit 134, which constitute a current computing-operated AGC circuit. This current calculating AGC circuit is disclosed in Japanese Laid-Open Patent Application No. 6-36303, for instance.

In the tracking error signal producing circuit 118 having the structure shown in FIG. 2, a tracking error signal TES is given by $$TES = R \times Iref \times (Ia-Ib)/(Ia+Ib) \qquad (1)$$

where R indicates the resistance value of the resistors R1 and R2, Iref indicates the current that passes through the current source 133, Ia and Ib indicate the currents supplied from the photo detector 117.

In the tracking error signal producing circuit 118 shown in FIG. 2, the tracking error signal TES is the ratio of a difference signal and a sum signal, which is not influenced by the light emission level during a recording operation or a reproducing operation.

When the input currents Ia and Ib become small, the input impedance becomes large. As the input impedance becomes large, the cutoff frequency of the low-pass filter, which is made up of the input impedance and the input capacitance, becomes lower.

The tracking error signal TES is used for track counting during the seek operation, as described above. Therefore, it is essential to satisfy the track zero-cross frequency at the maximum light moving speed when crossing the tracks. However, if the cutoff frequency decreases, the track zero-cross frequency might not be satisfied.

Also, in the pre-pit region in which ID signals and the likes are recorded, the amount of light reflected and returned from the disk medium 115 decreases. As a result, the tracking error signal becomes small, and the input currents Ia and Ib become even smaller.

SUMMARY OF THE INVENTION

A general object of the present invention is to provide information storage apparatuses in which the above disadvantages are eliminated.

A more specific object of the present invention is to provide an information storage apparatus that performs a stable seek operation.

Another specific object of the present invention is to provide an information storage apparatus that performs both a stable tracking control operation and a stable seek control operation.

The above objects of the present invention are achieved by an information storage apparatus that generates a tracking error signal based on a detection signal from a detector unit, and performs a control operation based on the tracking error signal, said apparatus comprising:

a plurality of tracking error signal generating units that generate tracking error signals by different processes based on the detection signal; and a selection unit that selects a tracking error signal corresponding to an operation mode from the tracking error signals generated by the plurality of tracking error signal generating units.

With this information storage apparatus of the present invention, a tracking error signal having characteristics suitable for the operation mode is generated so that a stable operation can be performed.

The above objects of the present invention are also achieved by a signal processing apparatus that performs a predetermined process on an input signal and outputs the processed signal, comprising:

a plurality of signal processing units that perform different processes based on the input signal; and a selecting unit that selects a signal corresponding to an operation mode from signals generated by the plurality of signal processing units.

The above objects of the present invention are also achieved by a control method comprising the steps of:

generating a plurality of tracking error signals by different processes based on a detection signal; and selecting a tracking error signal corresponding to an operation mode from the plurality of tracking error signals, thereby performing a control operation based on the selected tracking error signal.

With the signal processing apparatus and the control method, a tracking error signal having characteristics suitable for the operation mode is generated so that a stable operation can be performed.

The above and other objects and features of the present invention will become more apparent from the following description taken in conjunction with the accompanying drawings.

BRIEF DESCRIPTION OF THE DRAWINGS

FIG. 18 shows examples of switches applied to the tracking error signal generating circuit of the present invention; and FIG. 19 shows other examples of switches applied to the tracking error signal generating circuit of the present invention.

DESCRIPTION OF THE PREFERRED EMBODIMENTS

The following is a description of embodiments of the present invention.

Figure 3:
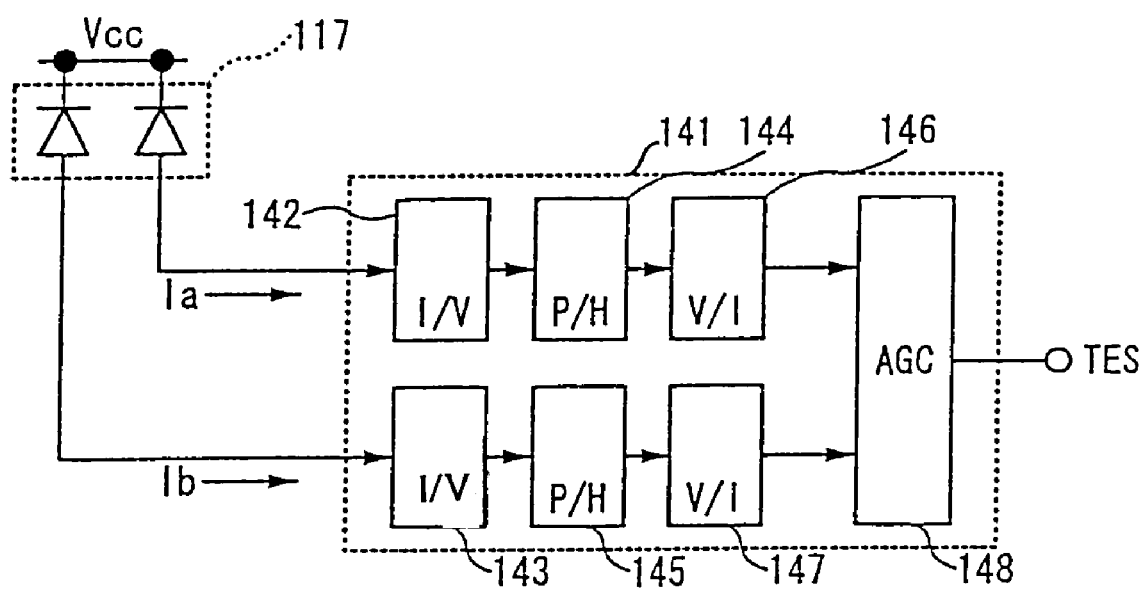
FIG. 3 is a block diagram of tracking error signal producing circuit in accordance with a first embodiment of the present invention.

FIG. 3 is a block diagram of a tracking error signal producing circuit in accordance with a first embodiment of the present invention.

A tracking error signal producing circuit 141 shown in FIG. 3 comprises current-voltage converter circuits 142 and 143, peak hold circuits 144 and 145, voltage-current converter circuits 146 and 147, and an AGC circuit 148.

The input currents Ia and Ib from a photo detector 117 are supplied to the current-voltage converter circuits 142 and 143. The current-voltage converter circuits 142 and 143 convert the input currents Ia and Ib into voltages Va and Vb.

The voltages Va and Vb are supplied to the peak hold circuits 144 and 145. The peak hold circuits 144 and 145 hold the peak values of the voltages Va and Vb, and supply the peak values to the voltage-current converter circuits 146 and 147. The voltage-current converter circuits 146 and 147 convert the peak hold values supplied from the peak hold circuits 144 and 145 into currents Ia' and Ib'. The output currents Ia' and Ib' of the voltage-current converter circuits 146 and 147 are supplied to the AGC circuit 148. The AGC circuit 148 has the same circuit structure as the circuit shown in FIG. 2, and generates a tracking error signal TES from the output currents Ia' and Ib' of the voltage-current converter circuits 146 and 147.

The tracking error signal TES outputted from the AGC circuit 148 is expressed as:

$$TES = R \times Iref \times (|Ia|ph - |Ib|ph)/(|Ia|ph + |Ib|ph) \tag{1}'$$

where |Ia|ph and |Ib|ph represent currents corresponding to the currents Ia' and Ib'.

In the tracking error signal producing circuit 141, the input currents Ia and Ib are converted into the voltages Va and Vb, and peak values thereof are held. Here, in the pre-pit portion for recording an ID signal or the like, when the input currents Ia and Ib sharply drop, the waveform of the tracking error signal TES can be shaped.

When the same amount of light reaches the 2-part photodetector and the same detection currents Ia and Ib are inputted to the tracking error signal detection circuit in the tracking error signal producing circuit 141 shown in FIG. 3, the tracking error signal should be a servo reference potential. However, if the detection currents Ia and Ib are small, an offset in the tracking error signal detection circuit can no longer be neglected, and an error is generated by the offset.

For instance, when an offset current Ioff is generated at one input side of the AGC circuit 148 due to an offset in the current-voltage converter circuits 142 and 143, the peak hold circuits 144 and 145, and the voltage-current converter circuits 146 and 147, the tracking error signal TES is determined from the equation (1)' and given by:

$$TES=R\times Iref\times(|Ia|ph+Ioff-|Ib|ph)/(|Ia|ph+Ioff+|Ib|ph) \quad (2)$$

If the detection signals Ia and Ib are large enough to ignore the offset current Ioff in the equation (2), the output result of the equation (2) becomes substantially equal to the output result of the equation (1).

On the other hand, if the detection currents Ia and Ib become too small to ignore the offset current Ioff in the equation (2), the output result of the equation (2) becomes different from the output result of the equation (1).

Figure 4:
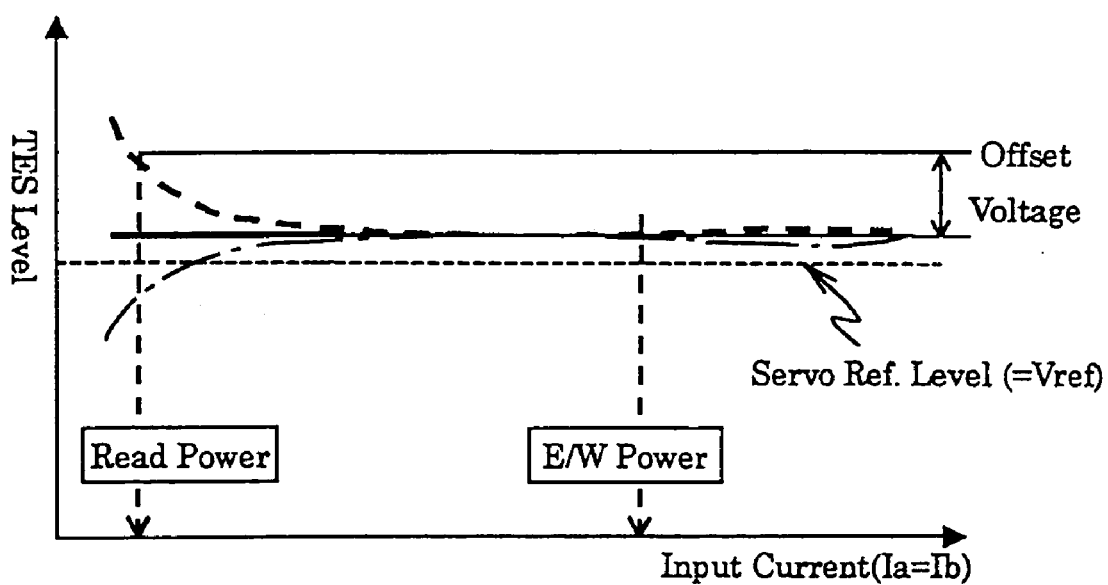
FIG. 4 shows the relationship between a tracking error signal and a detection current in the tracking error signal producing circuit of FIG. 3.

FIG. 4 shows the relationship between a tracking error signal and detection currents. In FIG. 4, the detection currents Ia and Ib are equal to each other, and the solid line indicates the characteristics of an ideal circuit that has no circuit offsets. The broken line and the dot-and-dash line each indicate the characteristics of a circuit that has a circuit offset. Here, the circuits indicated by the broken line and the dot-and-dash line exhibit circuit offsets having different polarities.

According to the characteristics indicated by the broken line, when the detection currents Ia and Ib are large, the tracking error signal are substantially constant. However, if the detection currents Ia and Ib are small, the offset current Ioff becomes large, resulting in an error.

In an optical disk apparatus, the power of the light to be emitted onto an optical disk at a time of recording or erasing is made large enough to form pits on the optical disk. However, at a time of reproducing, the power of the light is made small enough not to adversely influence the pits formed on the optical disk. Accordingly, the detection currents Ia and Ib are small, and the influence from the offset current Ioff becomes large at a time of reproducing.

In a case where the operation mode shifts from a reproducing operation to a recording or an erasing operation, the influence from the offset current Ioff fluctuates, and the tracking error signal changes. Although such a change of the tracking error signal is not caused by an actual tracking error, a tracking control operation is performed nevertheless.

Figure 5:
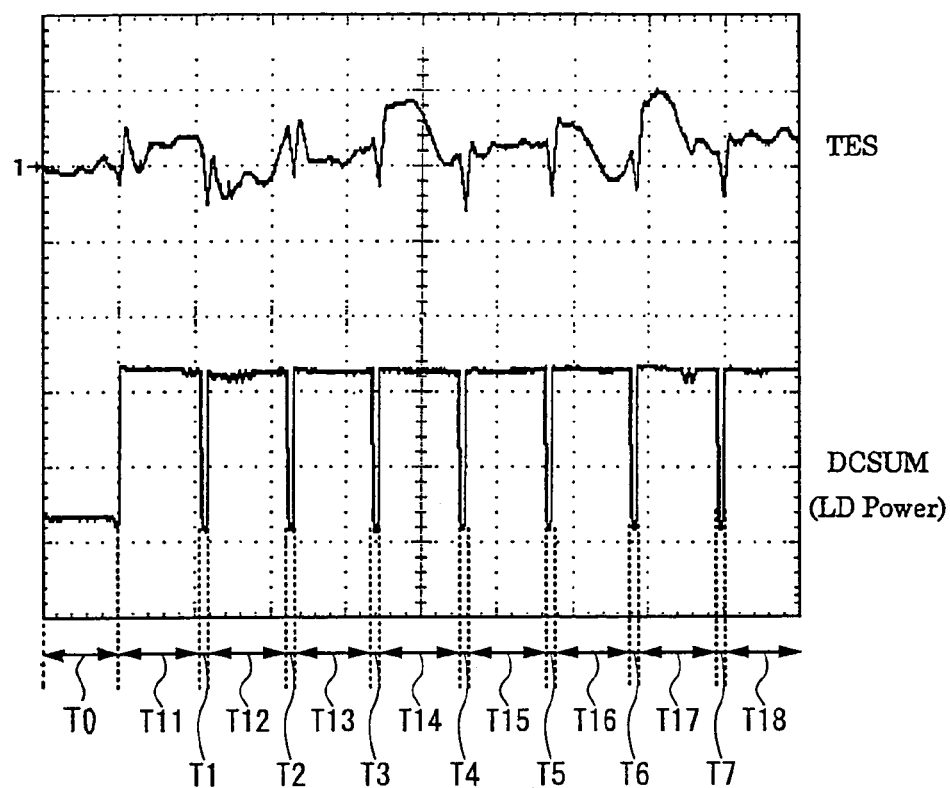
FIGS. 5A and 5B show fluctuations of tracking error signals when a reproducing operation and an erasing operation are alternately repeated.

FIGS. 5A and 5B show a fluctuation of a tracking error signal when a reproducing operation and an erasing operation are alternately repeated. FIG. 5A shows a tracking error signal, and FIG. 5B shows a laser power. Periods T0 to T7 indicate reproducing states, while periods T11 to T18 indicate erasing states.

As shown in FIG. 5A, the tracking error signal greatly fluctuates when the state makes a transition from a reproducing state to an erasing state, and from an erasing state to a reproducing state. If the tracking error signal exceeds the off-track slice level, it is determined that an off-track has occurred. As a result, a recording or erasing operation may be interrupted, though no off-track has actually occurred.

Also, the recording capacity is becoming larger, and shortwave semiconductor lasers are being employed in recent years. However, by employing such shortwave semiconductor lasers, the sensitivity of the photo detector deteriorates, and the detection currents further decrease. Furthermore, as the track pitch becomes narrower, the amplitude of the tracking error signal becomes smaller, and it is becoming more difficult to ignore an offset caused by the circuit offset.

Figure 6:
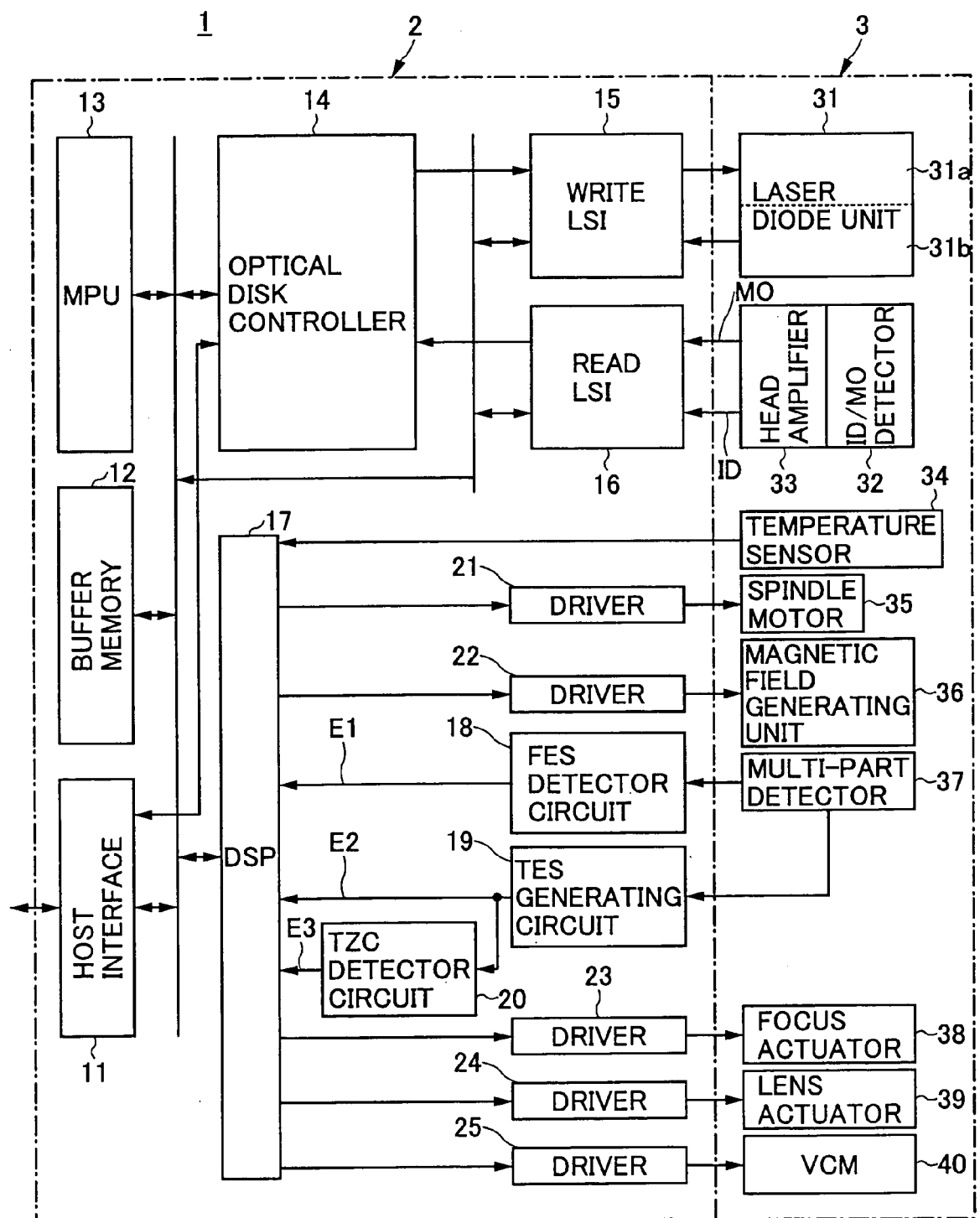
FIG. 6 is a block diagram of an information storage apparatus in accordance with a second embodiment of the present invention.

FIG. 6 is a block diagram of an information storage apparatus in accordance with a second embodiment of the present invention.

An information storage apparatus 1 of this embodiment comprises a control unit 2 and an enclosure 3.

The control unit 2 comprises an interface 11, a buffer memory 12, an MPU 13, an optical disk controller (ODC) 14, a write LSI 15, a read LSI 16, a DSP 17, a focusing error signal detection circuit 18, a tracking error signal generating circuit 19, a track zero-cross detection circuit 20, and drivers 21 to 25. The enclosure 3 comprises a laser diode unit 31, an ID/MO detector 32, a head amplifier 33, a temperature sensor 34, a spindle motor 35, a magnetic field generating unit 36, a multi-part detector 37 having a plurality of detecting parts, a focusing actuator 38, a lens actuator 39, and a voice coil motor (VCM) 40.

The interface 11 exchanges commands and data with a host apparatus. The buffer memory 12 is shared among the interface 11, the MPU 13, and the optical disk controller 14. The buffer memory 12 is used as a work storage area.

The MPU 13 controls the entire information storage apparatus 1. The optical disk controller 14 performs operation necessary for reading and writing data on and from a magneto-optical (MO) disk medium.

The write LSI 15 contains a write modulation circuit and a laser diode control circuit, and converts write data supplied from the optical disk controller 14 into PPM recording data or PWM recording data, depending on the type of the medium. The converted data is then supplied to the laser diode unit 31 in the enclosure 3. The laser diode unit 31 contains a laser diode 31a and a monitor detector 31b. The laser diode 31a emits light based on the data supplied from the write LSI 15. The monitor detector 31b detects the amount of light emission from the laser diode 31a, and supplies the detected value to the write LSI 15.

The read LSI 16 contains a read demodulation circuit and a frequency synthesizer. The read LSI 16 produces a read clock and read data from an ID signal and an MO signal supplied from the enclosure 3, thereby demodulating the original data. The DSP 123 performs various servo control operations, based on a temperature detection signal, a focusing error signal, a tracking error signal, and a zero-cross signal supplied from the enclosure 3. The focusing error signal detection circuit 18 detects the focusing error signal based on a detection signal supplied from the multi-part detector 37 in the enclosure 3. The tracking error signal generating circuit 19 detects the tracking error signal, based on a detection signal supplied from the multi-part detector 37 in the enclosure 3.

The driver 21 drives the spindle motor 35 in accordance with a drive signal supplied from the DSP 17. The driver 22 drives the magnetic field generating unit 36 in accordance with a magnetic field generating signal supplied from the DSP 17.

The magnetic field generating unit 36 is formed by an electromagnet, and can change a magnetic field applied to a magneto-optical disk depending on a drive signal from the driver 22. The magnetic field generating unit 36 is a magnetic head having coil wound around a magnetic pole, and may be either a floating type that floats from the medium or a contact type that is in contact with the medium.

The driver 23 drives the focusing actuator 38 in accordance with a focusing control signal supplied from the DSP 17. The driver 24 drives the lens actuator 39 in accordance with the tracking control signal supplied from the DSP 17. The driver 25 drives the VCM 40 in accordance with a VCM control signal supplied from the DSP 17.

Figure 7:
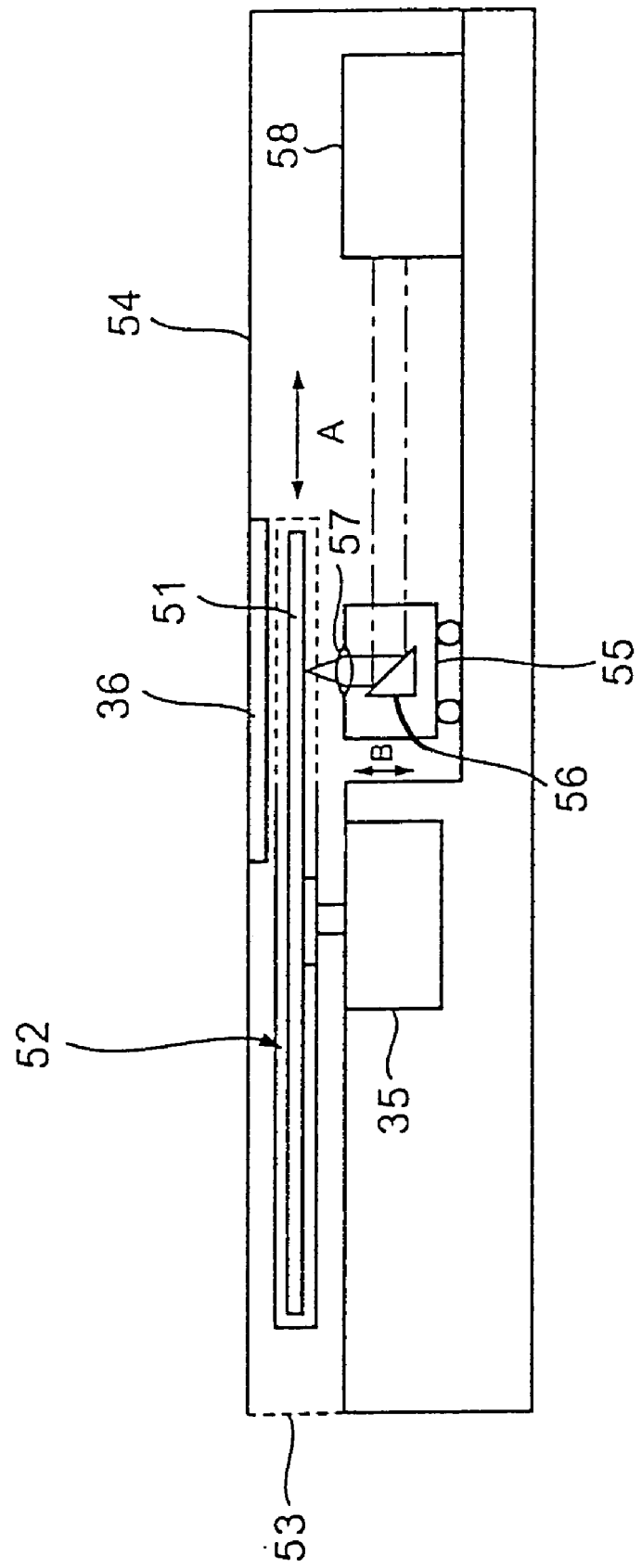
FIG. 7 is a schematic view of an enclosure in the information storage apparatus of FIG. 6.

FIG. 7 is a schematic view of the inside of the enclosure 3.

An MO cartridge 52 that accommodates an MO medium 51 is loaded into a housing 54 though an insertion opening 53. The MO medium 51 engages the spindle motor 35 inside the housing 54. The shutter of the MO cartridge 52 is opened in the housing 54, thereby exposing the MO medium 51. The MO medium 51 is interposed between a carriage 55 and the magnetic field generating unit 36.

The carriage 55 can be moved by the VCM 40 in the radial direction (indicated by the arrow A) of the MO medium 51. A prism 56 and an objective lens 57 are mounted on the carriage 55. The prism 56 deflects a laser beam emitted from a fixed optical system 58 toward the MO medium 51. The objective lens 57 converges a laser beam emitted from the prism 56 onto the MO medium 51.

The objective lens 57 is rocked by the focusing actuator 38 disposed on the carriage 55 in the direction of the arrow B, and also rocked by the lens actuator 39 disposed on the carriage 55 in the direction of the arrow A. The focusing actuator 38 rocks the objective lens 57 in the direction of the arrow B, thereby performing a focusing control operation. The lens actuator 39 rocks the objective lens 57 in the direction of the arrow A, thereby performing a tracking control operation.

Although the tracking control operation is performed by the VCM 40 and the lens actuator 39 in this embodiment, it can be performed only by the VCM 40.

Figure 8:
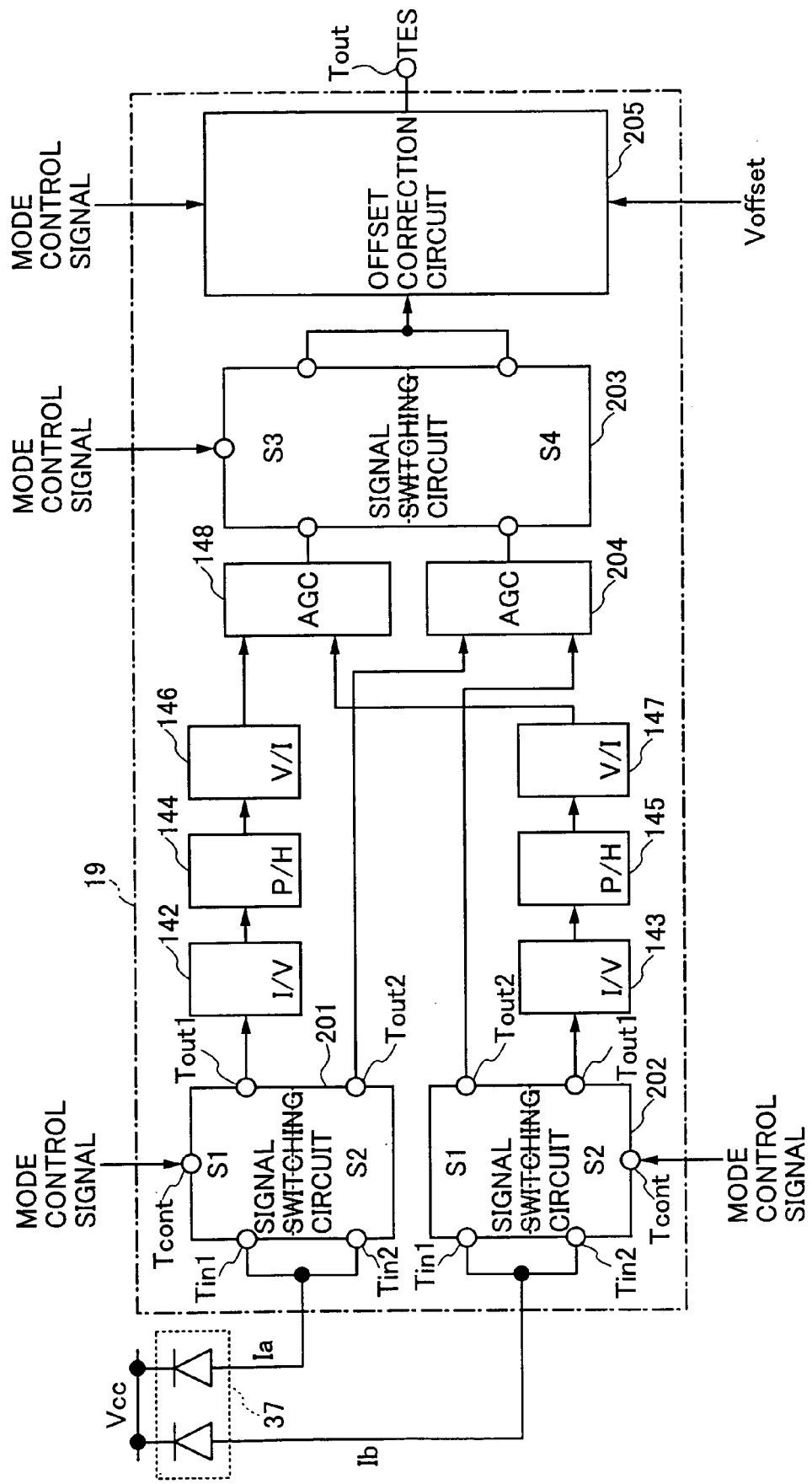
FIG. 8 is a block diagram of a tracking error signal generating circuit in the information storage apparatus of the present invention.

FIG. 8 is a block diagram of the tracking error signal generating circuit 19 of this embodiment. In this figure, the same components as in FIG. 3 are denoted by the same reference numerals.

The tracking error signal generating circuit 19 of this embodiment comprises signal switching circuits 201, 202, and 203, an AGC circuit 204, an offset compensation circuit 205, as well as the current-voltage converter circuits 142 and 143, the peak hold circuits 144 and 145, the voltage-current converter circuits 146 and 147, and the AGC circuit 148.

The signal switching circuits 201, 202, and 203 switch signals in accordance with a mode control signal supplied from the DSP 17. The mode control signal is generated by the DSP 17. The DSP 17 sets the mode control signal to the high level in a tracking mode, and sets the mode control signal at the low level in a seek operation mode. The tracking mode is a mode in which the light beam is made to follow the track on the MO medium 51.

The seek operation mode is a mode in which the light beam is moved across the tracks on the MO medium 51.

When the mode control signal supplied from the DSP 17 indicates the seek operation mode, the signal switching circuit 201 supplies the detection current Ia from the photo detector 37 to the current-voltage converter circuit 142. When the mode control signal indicates the tracking mode, the signal switching circuit 201 supplies the detection current Ia to the AGC circuit 204.

Figure 9:
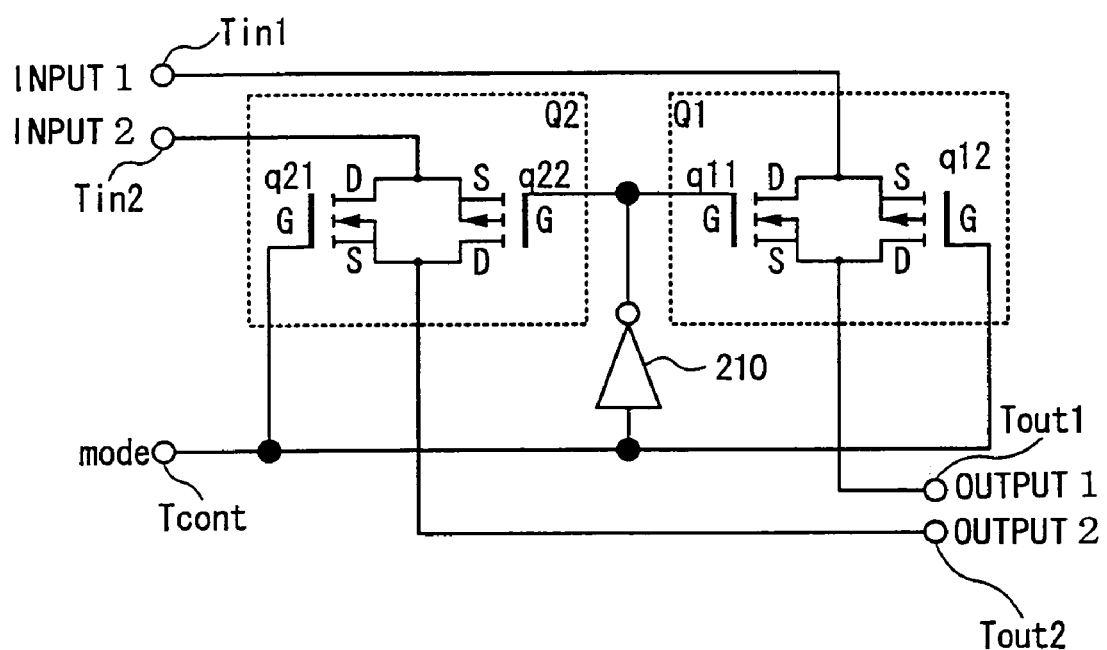
FIG. 9 is a circuit diagram of a signal switching circuit in the tracking error signal generating circuit of FIG. 8.

FIG. 9 is a circuit diagram of the signal switching circuit 201 of this embodiment.

The signal switching circuit 201 comprises a first transistor pair Q1, a second transistor pair Q2, and an inverting circuit 210. The first transistor pair Q1 is made up of an n-channel field-effect transistor q11 and a p-channel field-effect transistor q12. The drain of the transistor q11 is connected to a first input terminal Tin1, and the source of the transistor q11 is connected to a first output terminal Tout1. The output signal of the inverting circuit 210 is supplied to the gate of the transistor q11. The source of the transistor q12 is connected to the first input terminal Tin1, the drain of the transistor q12 is connected to the first output terminal Tout1. The gate of the transistor q12 is connected to a control terminal Tcont.

The second transistor pair Q2 comprises an n-channel field-effect transistor q21 and a p-channel field-effect transistor q22. The drain of the transistor q21 is connected to a second input terminal Tin2, while the source of the transistor q22 is connected to a second output terminal Tout2. The gate of the transistor q21 is connected to the control terminal Tcont. The source of the transistor q22 is connected to the second input terminal Tin2, while the drain of the transistor q22 is connected to the second output terminal Tout2. The output signal of the inverting circuit 210 is supplied to the gate of the transistor q22.

The inverting circuit 210 inverts the mode control signal supplied to the control terminal Tcont, and outputs the inverted signal.

The detection current Ia is supplied from the multi-part detector 37 to the first input terminal Tin1 and the second input terminal Tin2. The first output terminal Tout1 is connected to the current-voltage converter circuit 142, while the second output terminal Tout2 is connected to the AGC circuit 204.

When the mode control signal becomes low, the gate potentials of the transistors q12 and q21 become low, and the gate potentials of the transistors q11 and q22 become high. Accordingly, the transistors q11 and q12, i.e., the first transistor pair Q1, are switched on, while the transistors q21 and q22, i.e., the second transistor pair Q2, are switched off. The first transistor pair Q1 is switched on so that the detection current Ia is supplied to the current-voltage converter circuit 142.

The signal switching circuit 202 has the same structure as the signal switching circuit 201. More specifically, the detection current Ib is supplied from the multi-part detector 37 to the first input terminal Tin1 and the second input terminal Tin2. The first output terminal Tout1 is connected to the current-voltage converter circuit 143, while the second output terminal Tout2 is connected to the AGC circuit 204. When the mode control signal supplied from the DSP 17 indicates the seek operation mode, the signal switching circuit 202 supplies the detection current Ib from the multi-part detector 37 to the current-voltage converter circuit 143. When the mode control signal supplied from the DSP 17 indicates the tracking mode, the signal switching circuit 202 supplies the detection current Ib from the multi-part detector 37 to the AGC circuit 204.

The signal switching circuit 203 has the same structure as the signal switching circuit 201. More specifically, the first input terminal Tin1 is connected to the AGC circuit 148, and the second input terminal Tin2 is connected to the AGC circuit 204. The first output terminal Tout1 and second output terminal Tout2 are connected to a tracking error signal output terminal Tout. When the mode control signal supplied from the DSP 17 indicates the seek operation mode, the signal switching circuit 203 supplies the tracking error signal from the AGC circuit 148 to the offset compensation circuit 205. When the mode control signal supplied from the DSP 17 indicates the tracking mode, the signal switching circuit 203 supplies the tracking error signal from the AGC circuit 204 to the offset compensation circuit 205.

Figure 1:
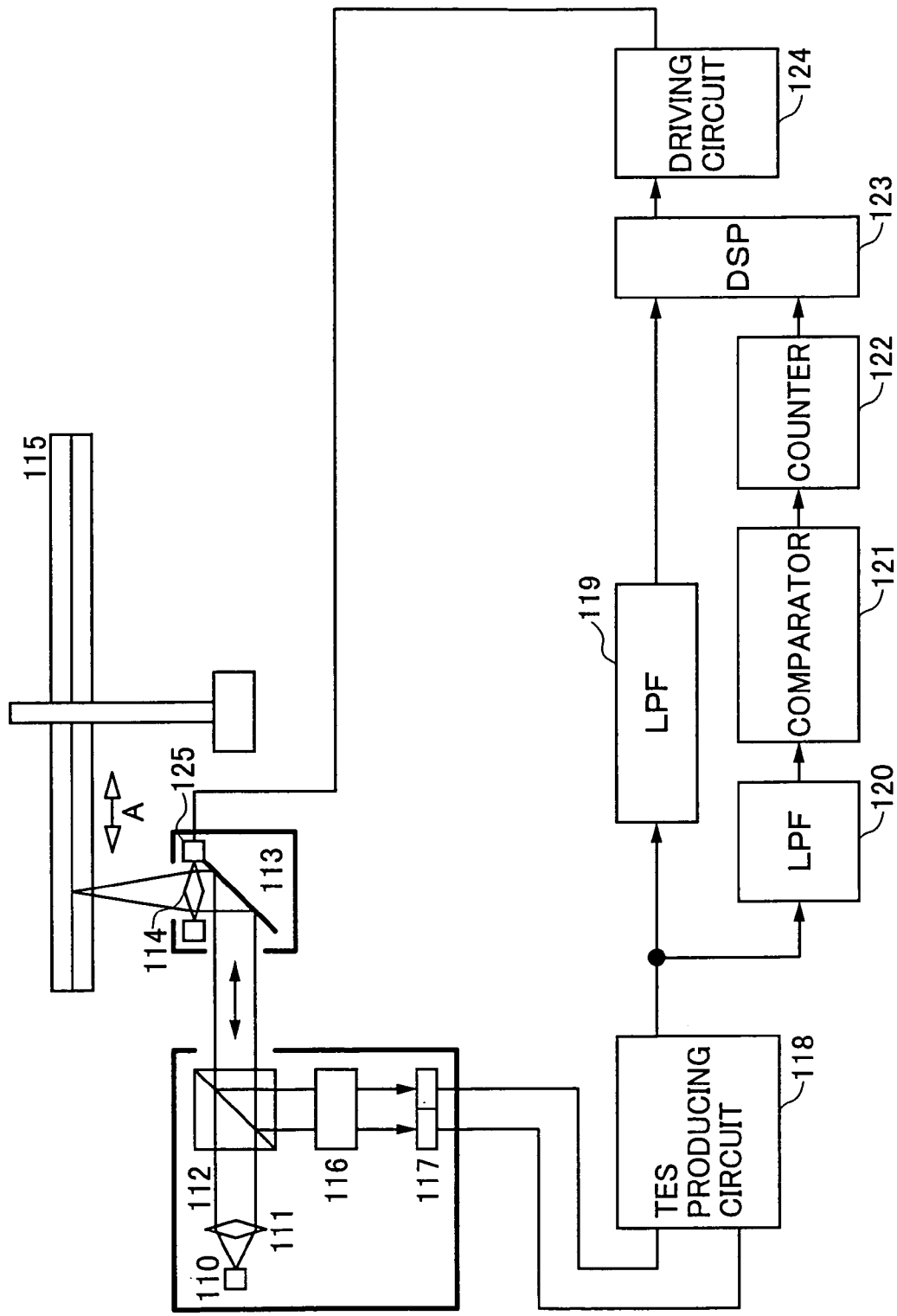
FIG. 1 is a block diagram of a conventional optical disk apparatus.
Figure 2:
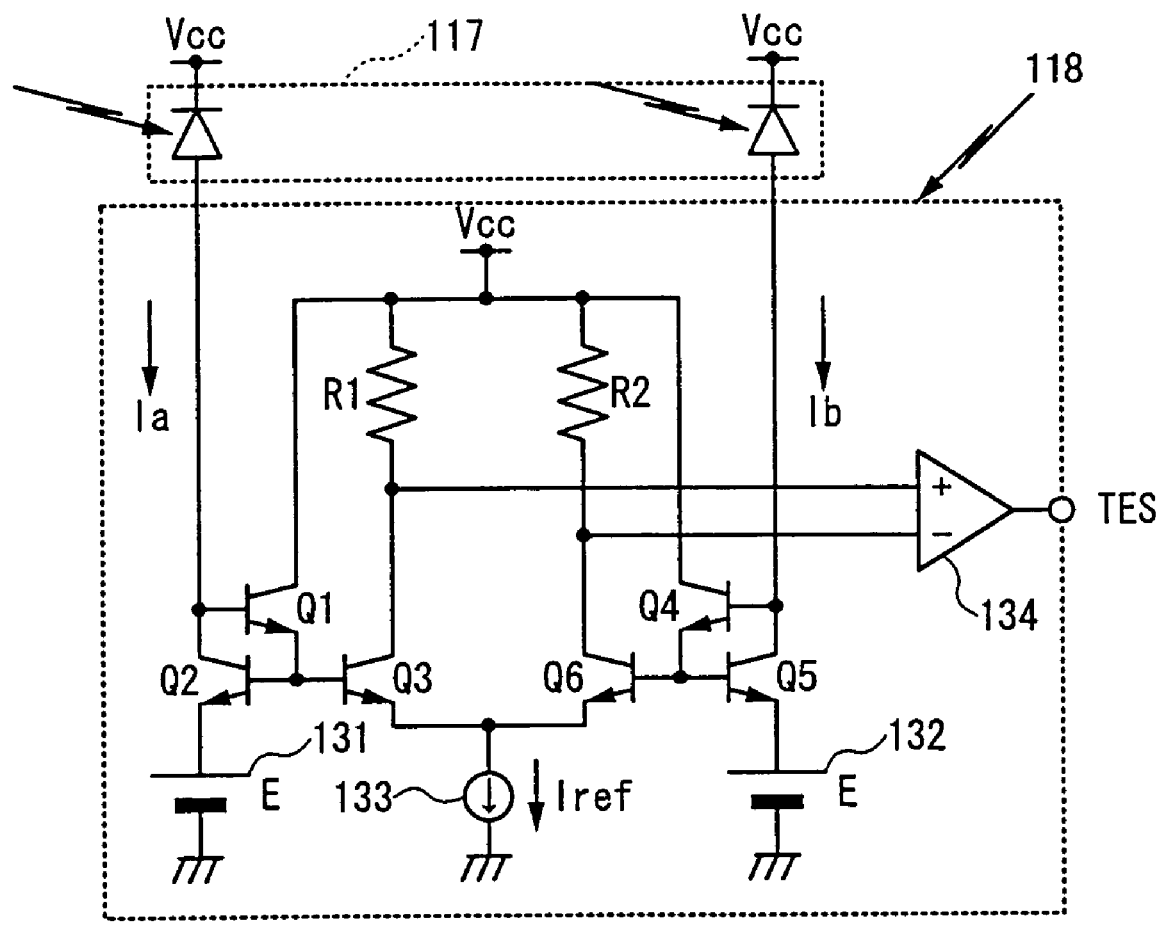
FIG. 2 is a circuit diagram of a conventional tracking error signal producing circuit.

The AGC circuit 204 has the same structure as the AGC circuit shown in FIG. 2. More specifically, the AGC circuit 204 amplifies the differential between the detection currents Ia and Ib supplied from the signal switching circuits 201 and 202, thereby generating the tracking error signal TES.

The offset compensation circuit 205 compensates for an offset of the tracking error signal TES supplied from the signal switching circuit 203.

Figure 10:
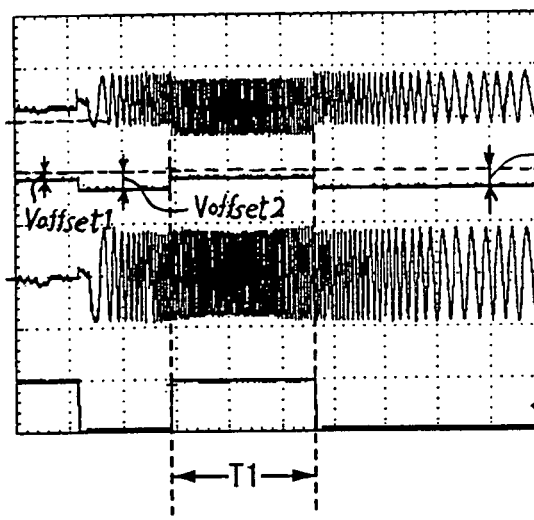
FIGS. 10A to 10D illustrate an operation of an offset compensation circuit in the tracking error signal generating circuit of FIG. 8.

FIGS. 10A to 10D illustrate operations performed by the offset compensation circuit 205 of this embodiment. In the operations shown in FIGS. 10A to 10D, the change in the offset is shown for two types of tracking error signals when the mode control signal is switched on and off in an off-track state. More specifically, FIG. 10A shows the tracking error signal TES supplied from the signal switching circuit 203. FIG. 10B shows the offset compensation voltage generated by the offset compensation circuit 205. FIG. 10C shows the output signal of the offset compensation circuit 205. FIG. 10D shows mode control signal.

When the mode control signal becomes high during a period T1 as shown in FIG. 10D, the offset compensation circuit 205 adds the offset compensation voltage Voffset shown in FIG. 10B to the tracking error signal TES shown in FIG. 10A, and amplifies the resultant signal.

When the mode control signal is high, the dc level of the tracking error signal TES supplied from the signal switching circuit 203 more closely approximates the servo reference potential as shown in FIG. 10A, compared with the case where the mode control signal is low.

In this embodiment, the offset compensation circuit 205 adds an offset compensation voltage Voffset1 during the period T1 and adds an offset compensation voltage Voffset2 during the other periods, thereby obtaining a signal that is free of the offsets as shown in FIG. 10C. Accordingly, the current-direct component can be prevented from fluctuating, and a stable tracking error signal TES can be obtained. Thus, a stable servo control operation can be performed.

The offset compensation voltages Voffset1 and Voffset2 which are used are stored in advance by measuring the offsets at the time of loading the medium. The offset measurement and offset storage control operations are performed by the DSP 17.

At the time of loading the medium, the spindle motor 35 is switched on, and the laser diode 31a emits light. The positioner disposed on the carriage 55 shown in FIG. 7 is then moved to the neighborhood of the center of the medium, and the focusing servo is switched on.

In this state, the mode control signal is changed to the high level, and the tracking error signal from the AGC circuit 204 is detected. The envelope of the tracking error signal supplied from the AGC circuit 204 is determined, and the difference between the center of the envelope and the servo reference potential is stored as an offset compensation value in the offset compensation circuit 205. Next, the mode control signal is changed to the low level, and the tracking error signal from the AGC circuit 148 is detected. The envelope of the tracking error signal from the AGC circuit 148 is then determined, and the difference between the center of the envelope and the reference potential is stored as an offset compensation value in the offset compensation circuit 205.

In this embodiment, when the mode control signal is low, i.e., during the seek operation, the detection currents Ia and Ib from the multi-part detector 37 are supplied to the AGC circuit 148 via the current-voltage converter circuits 142 and 143, the peak hold circuits 144 and 145, and the voltage-current converter circuits 146 and 147. The signals that are differentially-amplified by the AGC circuit 148 are outputted as the tracking error signal TES. When the mode control signal is high, i.e., during the tracking operation, the detection currents Ia and Ib from the multi-part detector 37 are supplied directly to the AGC circuit 204. The signals that are differentially-amplified by the AGC circuit 204 are outputted as the tracking error signal TES.

In this embodiment, during the seek operation, the signals obtained by holding peak values of the detection currents Ia and Ib are differentially-amplified by the AGC circuit 148. By doing so, the tracking error can be reproduced accurately even in a high-frequency band area, and erroneous track counting can be prevented. During the tracking operation, the detection currents Ia and Ib are supplied directly to the AGC circuit 204, and differentially-amplified to generate the tracking error signal. Even if the amount of laser light fluctuates, a stable tracking error signal TES can thus be obtained.

Although each of the signal switching circuits 201, 202, and 203 is constituted by the field-effect transistors, it is possible to employ bipolar transistors for the signal switching circuits 201, 202, and 203. It is also possible to combine field-effect transistors and bipolar transistors to constitute each of the signal switching circuits 201, 202, and 203.

Figure 11:
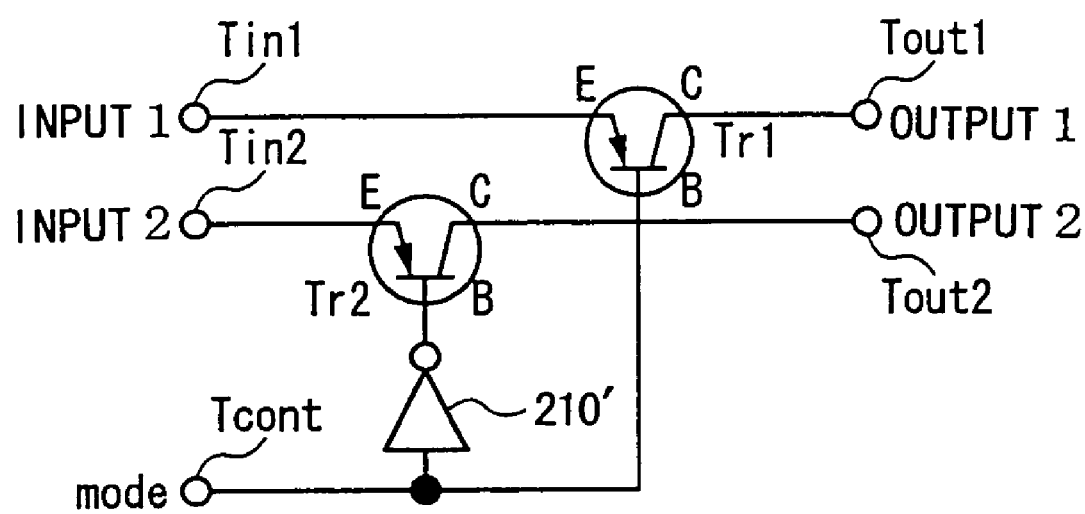
FIG. 11 is a circuit diagram of a modification of the signal switching circuit of FIG. 9.

FIG. 11 is a circuit diagram of a modification of a signal switching circuit of this embodiment. In this figure, the same components as in FIG. 9 are denoted by the same reference numerals.

A signal switching circuit 201' of this modification comprises PNP transistors Tr1 and Tr2 and an inverting circuit 210. The emitter of the transistor Tr1 is connected to the first input terminal Tin1, the collector of the transistor Tr1 is connected to the first output terminal Tout1, and the base of the transistor Tr1 is connected to the control terminal Tcont. The emitter of the transistor Tr2 is connected to the second input terminal Tin2, the collector of the transistor Tr2 is connected to the second output terminal Tout2, and the base of the transistor Tr2 is connected to the output of the inverting circuit 210.

When the mode control signal is low, the transistor Tr1 is on, and the transistor Tr2 is off. When the mode control signal is high, the transistor Tr1 is off, and the transistor Tr2 is on.

The signal switching circuit 202' may have the same structure as the signal switching circuit 201' described above. The signal switching circuits 201' and 202' formed by bipolar transistors can extend the high-frequency band, compared with a case where field-effect transistors are used. Accordingly, the signal switching circuit shown in FIG. 11 can be effectively used for the signal switching circuit 202' which is required to operate in a high-frequency band.

Furthermore, the signal switching circuits 201' and 202' that are constituted by bipolar transistors can realize the following switching operation. In a low-speed seek operation mode, the mode control signal is low, and the detection currents Ia and Ib from the multi-part detector 37 are supplied to the AGC circuit 148 via the voltage-current converter circuits 146 and 147. The signals that are differentially-amplified by the AGC circuit 148 are outputted as the tracking error signal TES. In the tracking operation and the high-speed seek operation, the mode control signal is high, and the detection currents Ia and Ib from the multi-part detector 37 are supplied directly to the AGC circuit 204. The signals that are differentially-amplified by the AGC circuit 204 are outputted as the tracking error signal TES.

Although the tracking error signal generating circuit of this embodiment includes the two independent AGC circuits for the tracking operation and the seek operation, it is possible to provide a single AGC circuit in common for both the tracking operation and the seek operation.

Figure 12:
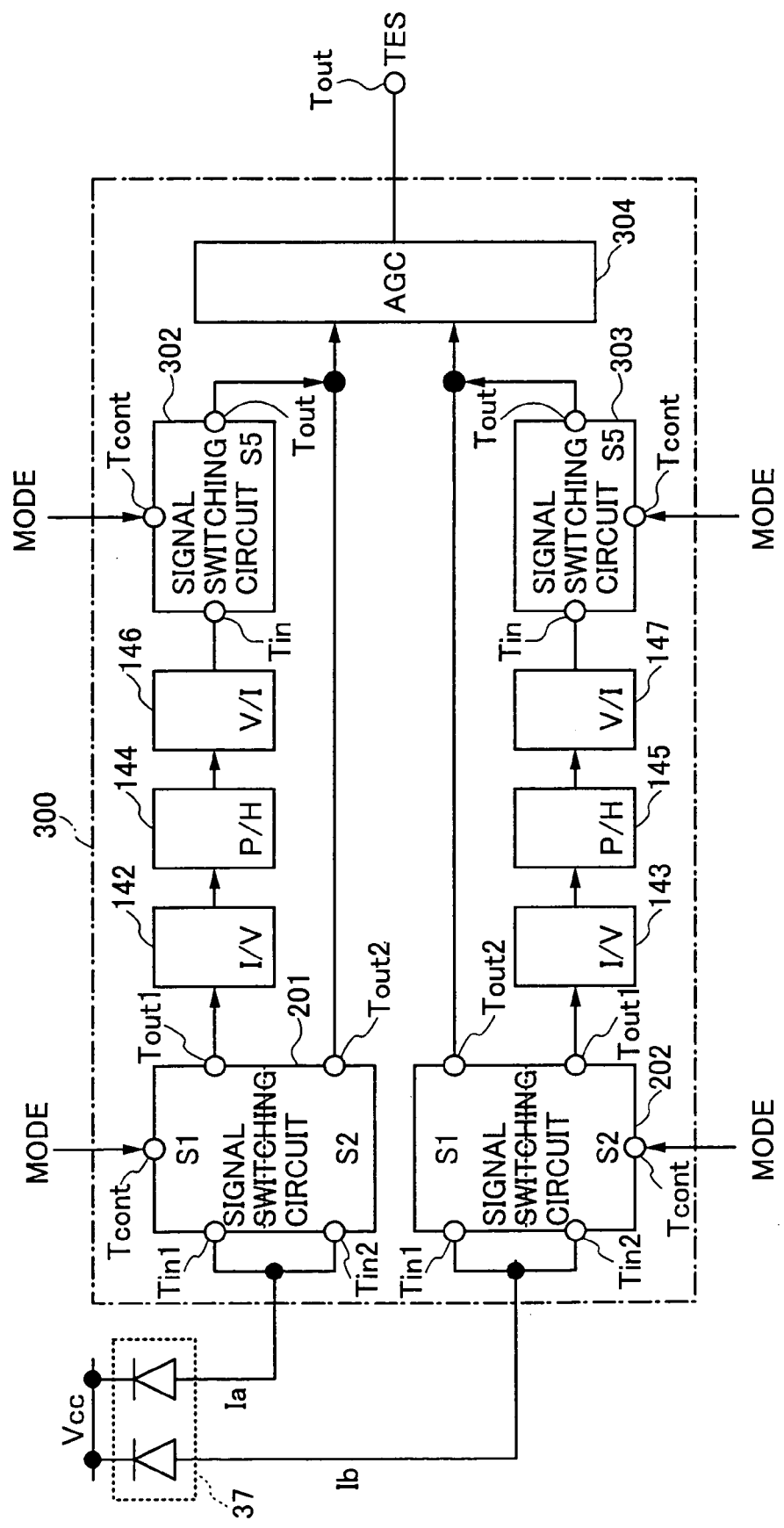
FIG. 12 is a block diagram of a modification of the tracking error signal generating circuit of FIG. 8.

FIG. 12 is a block diagram of a modification of the tracking error signal generating circuit of this embodiment.

In this figure, the same components as in FIG. 8 are denoted by the same reference numerals, and the explanations for them are omitted.

A tracking error signal generating circuit 300 of this modification generates a tracking error signal with signal switching circuits 302 and 303, and a single AGC circuit 304.

The signal switching circuits 302 and 303 have the same structure. More specifically, when the mode control signal is low, i.e., in the seek operation mode, the signal switching circuits 302 and 303 are on. When the mode control signal is high, i.e., in the tracking operation mode, the signal switching circuits 302 and 303 are off.

Figure 13:
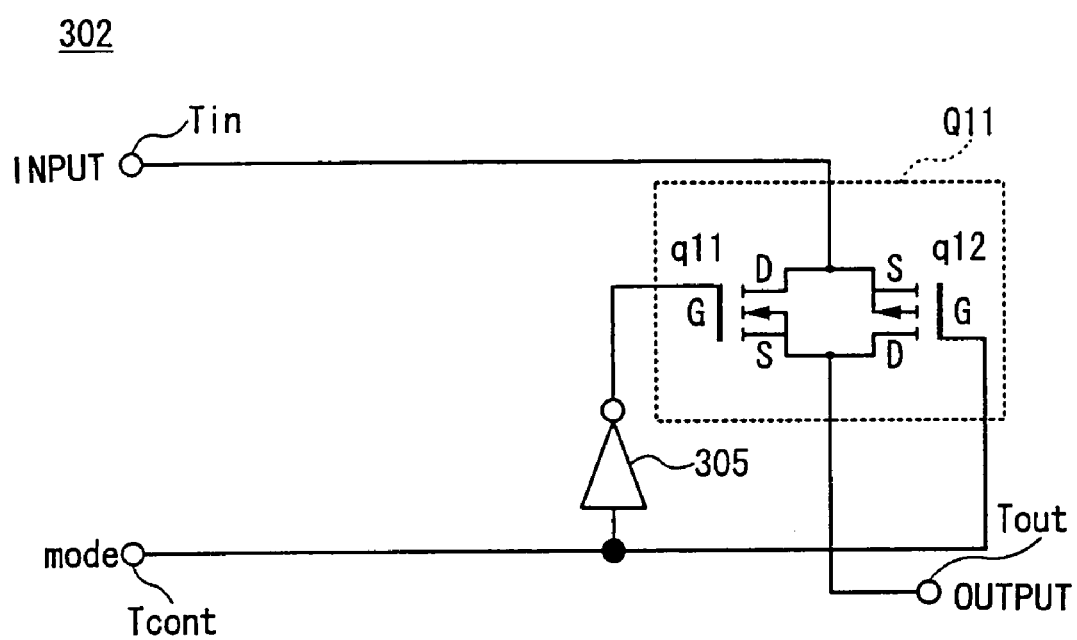
FIG. 13 is a circuit diagram of a signal switching circuit in the modification of the tracking error signal generating circuit of FIG. 8.

FIG. 13 is a circuit diagram of a signal switching signal of the modification of the tracking error signal generating circuit shown in FIG. 12.

The input terminal Tin of the signal switching circuit 302 is connected to the voltage-current converter circuit 146, and the output terminal Tout of the signal switching circuit 302 is connected to the AGC circuit 304. The mode control signal is supplied from the DSP 17 to the control terminal Tcont. The signal switching circuit 302 comprises a transistor pair Q11 and an inverting circuit 305. The transistor pair Q11 includes an n-channel field-effect transistor q11 and a p-channel field-effect transistor q12.

The drain of the transistor q11 is connected to the input terminal Tin, and the source of the transistor q11 is connected to the output terminal Tout. The output of the inverting circuit 305 is supplied to the gate of the transistor q11. The source of the transistor q12 is connected to the input terminal Tin, and the drain of the transistor q12 is connected to the output terminal Tout. The gate of the transistor q12 is connected to the control terminal Tcont.

In the signal switching circuit 302, when the mode control signal is low, the transistors q11 and q12 are on. The current from the voltage-current converter circuit 146 is supplied to the AGC circuit 304. When the mode control signal is high, the transistors q11 and q12 are off. The current supply from the voltage-current converter circuit 146 to the output terminal Tout is stopped.

The signal switching circuit 303 has the same structure as the signal switching circuit 302. The input terminal Tin is connected to the voltage-current converter circuit 147, and the output terminal Tout is connected to the AGC circuit 304. The mode control signal is supplied from the DSP 17 to the control terminal Tcont. In the signal switching circuit 303, when the mode control signal is low, the transistors q11 and q12 are on. The current from the voltage-current converter circuit 147 is supplied to the AGC circuit 304. When the mode control signal is high, the transistors q11 and q12 are off. The current supply from the voltage-current converter circuit 147 to the output terminal Tout is stopped.

The signal switching circuits 302 and 303 may also be formed by bipolar transistors.

Figure 14:
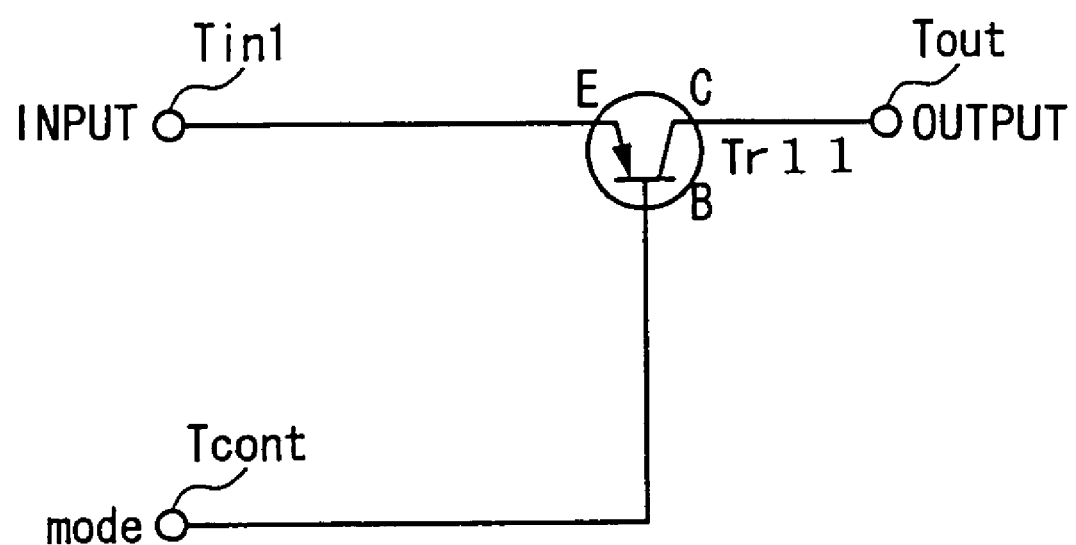
FIG. 14 is a circuit diagram of a modification of the signal switching circuit of FIG. 13.

FIG. 14 is a circuit diagram of a modification of the signal switching circuit of the modification of the tracking error signal generating circuit of this embodiment.

A signal switching circuit 302' of this modification comprises a PNP transistor Tr11. The emitter of the transistor Tr11 is connected to the input terminal Tin, the collector of the transistor Tr11 is connected to the output terminal Tout, and the base of the transistor Tr11 is connected to the control terminal Tcont.

In the signal switching circuit 302', when the mode control signal is low, the transistor Tr11 is on, and the current from the voltage-current converter circuit 146 is supplied to the AGC circuit 304. When the mode control signal is high, the transistor Tr11 is off, and the current supply from the voltage-current converter circuit 146 to the output terminal Tout is stopped.

In the signal switching circuit 303', when the mode control signal is high, the transistor Tr11 is on, and the current from the voltage-current converter circuit 147 is supplied to the AGC circuit 304. When the mode control signal is high, the transistor Tr11 is off, and the current supply from the voltage-current converter circuit 147 to the output terminal Tout is stopped.

In this modification, during the seek operation, the detection currents Ia and Ib are supplied to the AGC circuit 304 via the current-voltage converter circuits 142 and 143, the peak hold circuits 144 and 145, the voltage-current converter circuits 146 and 147, and the signal switching circuits 302' and 303'. During the tracking operation, the detection currents Ia and Ib are supplied to the AGC circuit 304 via the signal switching circuits 302' and 303'.

In accordance with this modification, the single AGC circuit 304 suffices the functions of the two AGC circuits of the foregoing embodiment.

In the tracking operation, which requires a high-frequency band component, the detection currents Ia and Ib pass through only the signal switching circuits 302' and 303'. As the detection currents Ia and Ib do not pass through unnecessary circuits, no attenuation is caused in the high-frequency component, and the detection currents Ia and Ib can be supplied directly to the AGC circuit 304.

The signal switching circuits 302' and 303' may be formed by bipolar transistors, so that the following switching operation can be performed.

In a low-speed seek operation mode, the mode control signal is low, and the detection currents Ia and Ib from the multi-part detector 37 are supplied to the AGC circuit 304 via the voltage-current converter circuits 146 and 147. The signals that are differentially-amplified by the AGC circuit 304 are outputted as the tracking error signal TES. In the tracking operation and a high-speed seek operation, the mode control signal is high, and the detection currents Ia and Ib are supplied from the multi-division detector 37 directly to the AGC circuit 304. The signals that are differentially-amplified by the AGC circuit 304 are outputted as the tracking error signal TES.

Furthermore, the time constant (droop rate) of the peak hold circuits 144 and 145 may be switched between the low-speed seek operation and the high-speed seek operation.

Figure 15:
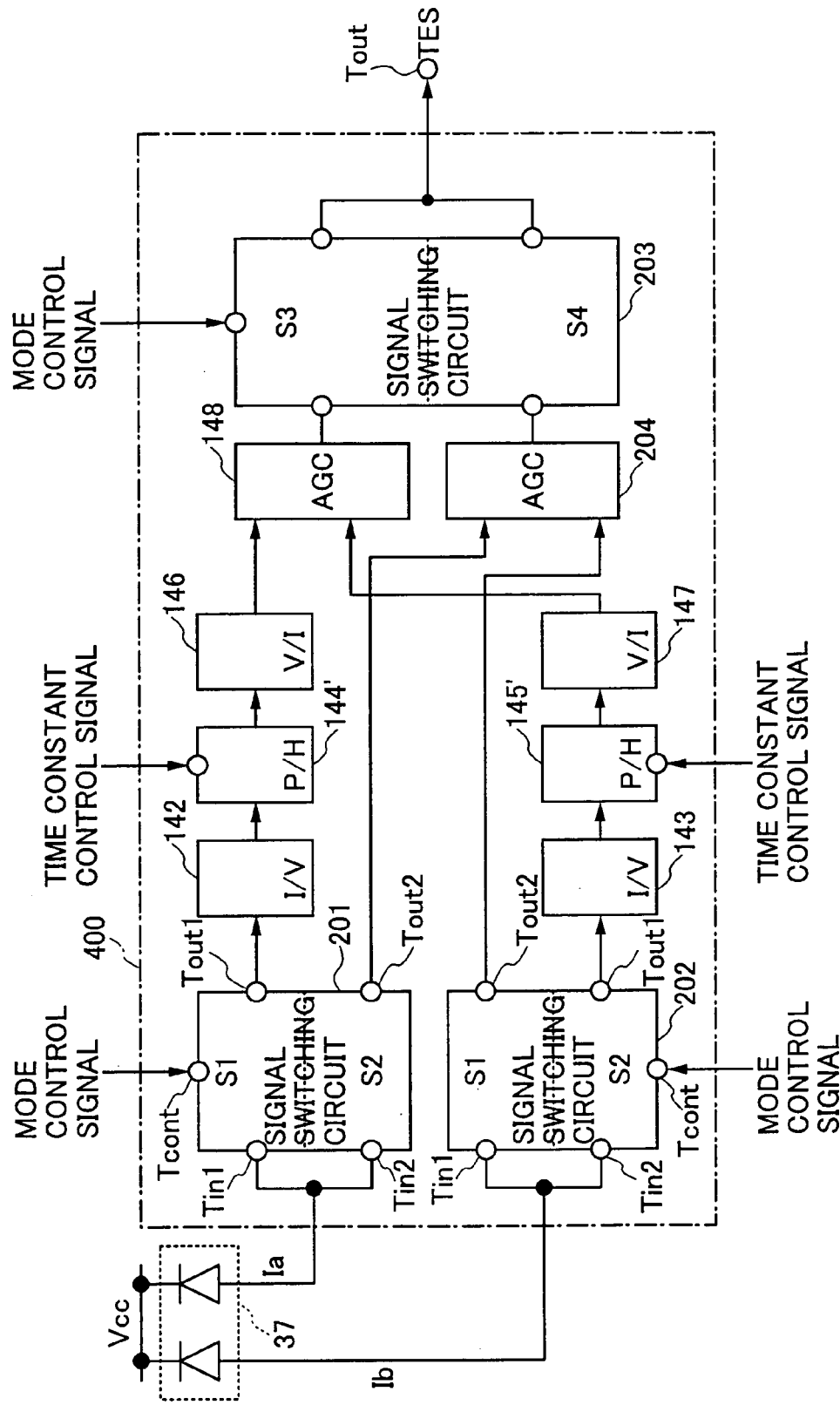
FIG. 15 is a block diagram of a second modification of the tracking error signal generating circuit of the second embodiment of the present invention.

FIG. 15 is a block diagram of a second modification of the tracking error signal generating circuit of this embodiment. In this figure, the same components as in FIG. 8 are denoted by the same reference numerals, and the explanations for them are omitted.

In a tracking error signal generating circuit 400 of this modification, the time constants of peak hold circuits 144' and 145' are switched by a time constant control signal supplied from the DSP 17. The DSP 17 distinguishes between a low-speed seek operation and a high-speed seek operation. In the low-speed seek operation, the DSP 17 changes the time constant control signal to the low level. In the high-speed seek operation, the DSP 17 changes the time constant control signal to the high level.

When the time constant control signal from the DSP 17 is high, the time constants of the peak hold circuits 144' and 145' are set large. When the time constant control signal from the DSP 17 is low, the time constants of the peak hold circuits 144' and 145' are set small.

Figure 16:
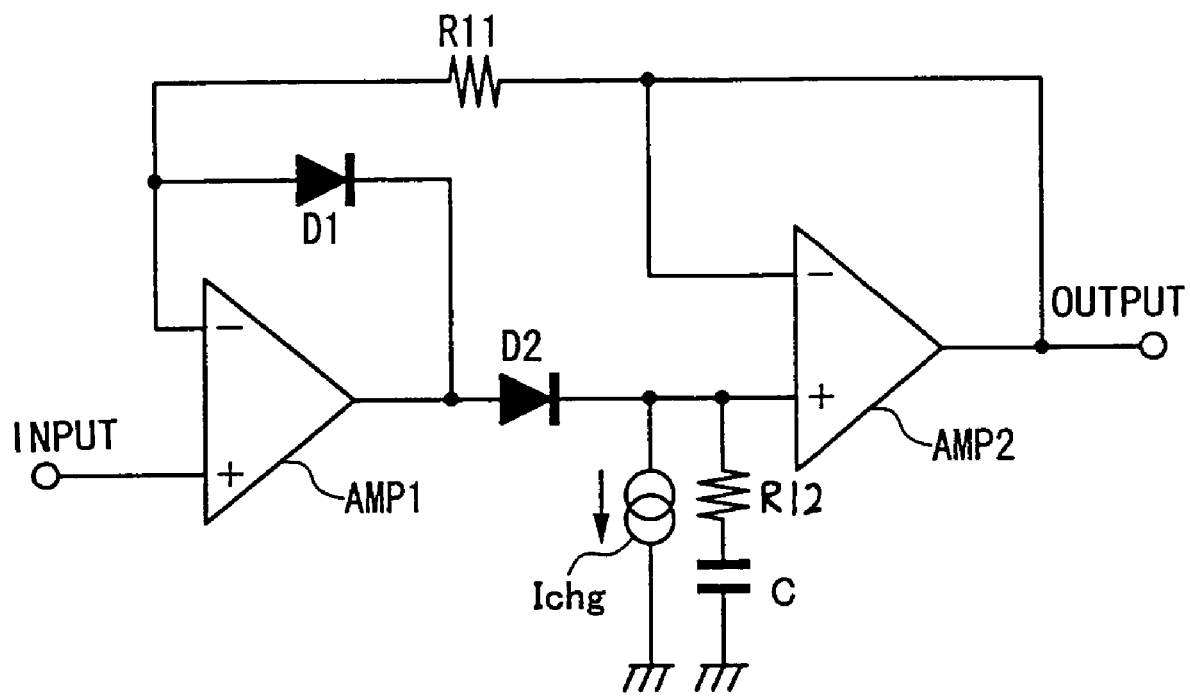
FIG. 16 is a circuit diagram of a peak hold circuit in the tracking error signal generating circuit of the second embodiment shown in FIG. 8.

FIG. 16 is a circuit diagram of a peak hold circuit of the second modification of the tracking error signal generating circuit.

The peak hold circuit 144' comprises operational amplifiers AMP1 and AMP2, diodes D1 and D2, resistors R11 and R12, and a current source Icharge. The operation amplifier AMP1, the resistor R11, and the diode D1 constitute a feedback loop. The feedback loop and the diode D2 constitute an ideal diode that charges a capacitor C. As the input voltage drops and the diode D2 is switched off, the charge in the capacitor C is discharged by the current source Icharge. Here, the discharge current is restricted by the resistor R12, and the discharging is carried out at a predetermined time constant.

As the equation I=C (dV/dt) is satisfied here, the time constant (droop rate) $\tau$ is given by the following equation:

$$\tau = (dV/dt) = I/C$$

More specifically, the time constant is determined from the current that passes through the current source Icharge and/or the capacitance of the capacitor C. Accordingly, the current source Icharge or the capacitor C may be switched by the time constant control signal in order to switch the droop rate.

The time constants of the peak hold circuits 144' and 145' are small in the low-speed seek operation, and large in the high-speed seek operation. Thus, the time constants can be always set to the optimum values, and a stable seek operation can be performed.

For instance, the switching between the low-speed seek operation and the high-speed seek operation is carried out based on a target speed during the seek operation. The switching may also be carried out based on the moving speed of the light beam detected during the seek operation.

Figure 17:
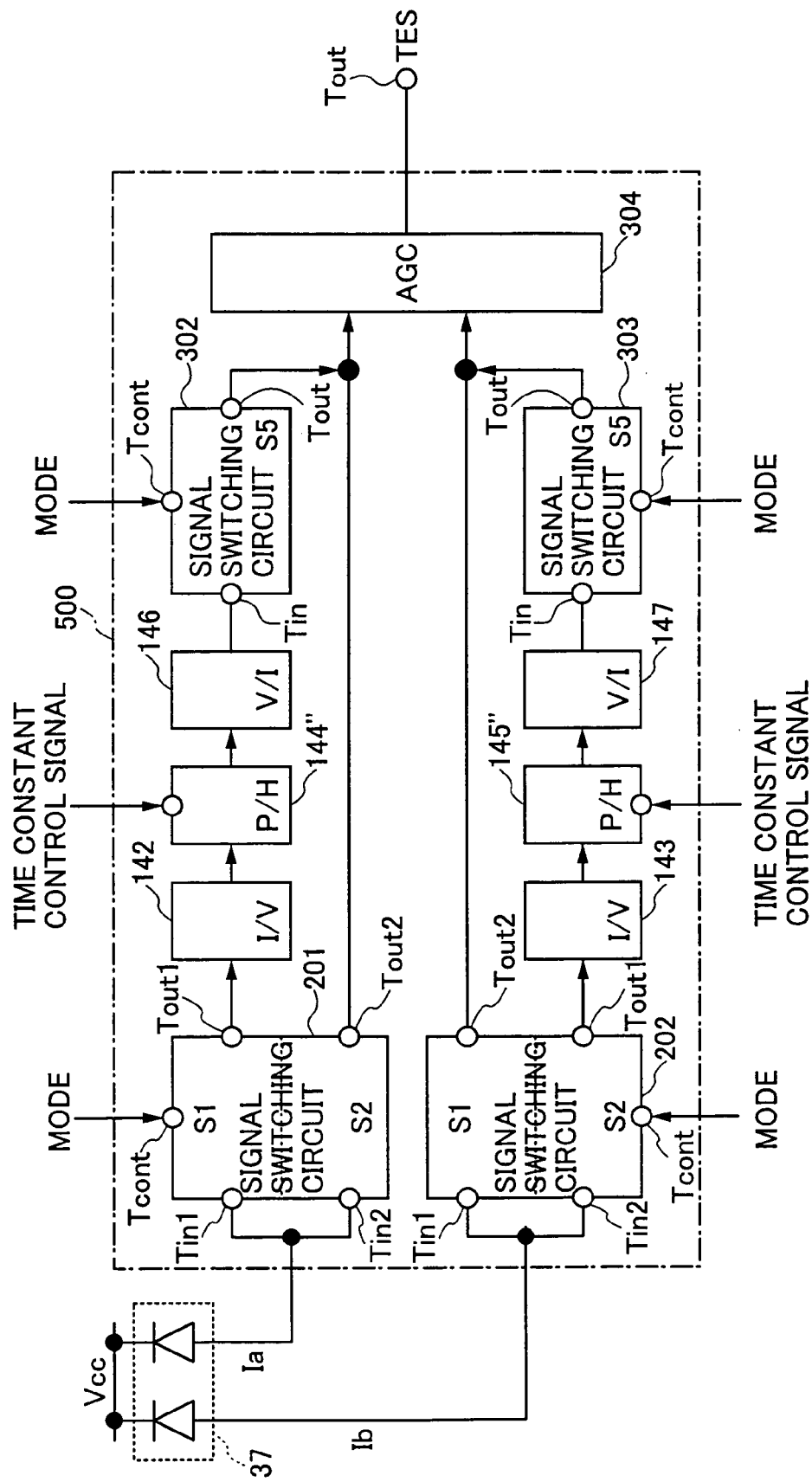
FIG. 17 is a block diagram of a third modification of the tracking error signal generating circuit of the second embodiment shown in FIG. 8.

FIG. 17 is a block diagram of a third modification of the tracking error signal generating circuit of the present invention. In this figure, the same components as in FIG. 12 are denoted by the same reference numerals, and the explanations for them are omitted in the following description.

A tracking error signal generating circuit 500 of this embodiment is the same as the tracking error signal generating circuit 300 shown in FIG. 12, except that the time constants of the peak hold circuits 144'' and 145'' are switched by the time constant control signal supplied from the DSP 17 in the same manner as in the modification shown in FIG. 15.

For each of the signal switching circuits 201, 202, 203, 302, and 303, it is also possible to employ a combination of switches formed by the field-effect transistors shown in FIGS. 9 and 13, and switches formed by the bipolar transistors shown in FIGS. 11 and 14.

Figure 18:
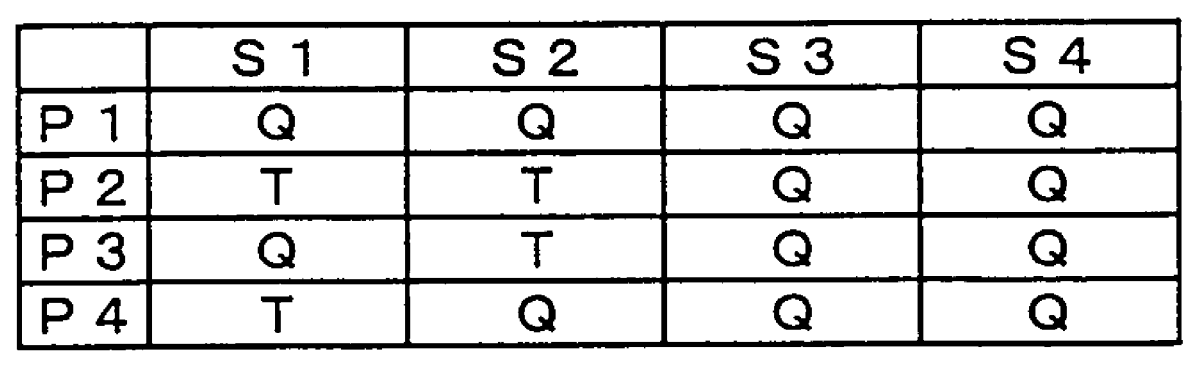

FIGS. 18 and 19 show application of the switches to the tracking error signal generating circuit of the present invention.

In FIGS. 18 and 19, S1 denotes the switch disposed between the first input terminal Tin1 and the first output terminal Tout1 of each of the signal switching circuits 201 and 202. S2 denotes the switch disposed between the second input terminal Tin2 and the second output terminal Tout2 each of the signal switching circuits 201 and 202. S3 denotes the switch disposed between the first input terminal Tin1 and the first output terminal Tout1 of the signal switching circuit 203. S4 denotes The switch disposed between the second input terminal Tin2 and the second output terminal Tout2 of the signal switching circuit 203. S4 also denotes the switch disposed in the signal switching circuit 302, and S5 denotes the switch disposed in the signal switching circuit 303. Each field-effect transistor is indicated by "Q", and each bipolar transistor is indicated by "T".

Patterns P1 to P4 shown in FIG. 18 are applicable to the tracking error signal generating circuits shown in FIGS. 8 and 15. Patterns P5 to P8 shown in FIG. 19 are applicable to the tracking error signal generating circuits shown in FIGS. 12 and 17.

Although two optimum types of tracking error signals for the two types of operation modes are generated in this embodiment, a plurality of optimum tracking error signals for a plurality of operation modes may be generated and selectively used depending on the operation mode.

In this embodiment, the detection currents Ia and Ib are obtained from the anode side of the multi-part detector 37. However, it is also possible to acquire detection currents from the cathode side of the multi-part detector 37.

In this embodiment, the tracking error signals are switched between the seek operation mode and the tracking operation mode. However, the signal switching may be made when two or more operation modes require different characteristics. For instance, the tracking error signals may be switched between a ROM part and a RAM part on an optical disk medium.

Generally, an optical disk medium comprises a RAM region in which information can be recorded and a ROM region in which pre-recorded information cannot be rewritten and no new information can be additionally recorded. Here, reproduced signals from the ROM region are pre-pit signals. Accordingly, the input currents Ia and Ib suddenly change. When a tracking operation is performed on the RAM region, the tracking error signal generated by the second tracking error signal generating unit is selected. When the tracking operation is performed on the ROM region, the tracking error signal generated by the first tracking error signal generating unit is selected. The input currents Ia and Ib are converted into voltages Va and Vb, and the peak values are held. Thus, an adverse influence on the tracking error signal from the sudden change of the input currents Ia and Ib can be reduced.

The gain of each of the circuits 19, 300, 400, and 500 is adjusted in such a manner that the tracking error signals outputted from the circuits 19, 300, 400, and 500 become substantially equal to each other. It is also possible to control the gain by the DSP 17. Thus, the tracking error signal can be prevented from fluctuating when the operation mode is switched.

Also, the selecting operation by the selecting unit can be performed by the MPU 13 or the DSP 17 by software.

The present invention is not limited to the specifically disclosed embodiments, but variations and modifications may be made without departing from the scope of the present invention.

The present application is based on Japanese patent application No. 2000-229691, filed on Jul. 28, 2000, the entire contents of which are hereby incorporated by reference.

What is claimed is:

1. An information storage apparatus that generates a tracking error signal based on a detection signal from a detector unit, and performs a control operation based on the tracking error signal, said apparatus comprising:

a plurality of tracking error signal generating units that generate tracking error signals by different processes based on the detection signal; and a selection unit that selects a tracking error signal corresponding to an operation mode from the tracking error signals generated by the plurality of tracking error signal generating units, wherein the plurality of tracking error signal generating units include:

a first tracking error signal generating unit that amplifies a peak value of the detection signal to generate a tracking error signal; and a second tracking error signal generating unit that amplifies the detection signal to generate a tracking error signal, wherein the selection unit selects the tracking error signal generated by the first tracking error signal generating unit when the operation mode is a seek operation mode, and selects the tracking error signal generated by the second tracking error signal generating unit when the operation mode is a tracking operation mode.

2. The information storage apparatus as claimed in claim 1, further comprising a correction unit that corrects a dc component of the tracking error signal selected by the selection unit.

3. The information storage apparatus as claimed in claim 1, wherein gains of the plurality of tracking error signal generating units are controlled so as to generate substantially identical tracking error signals.

4. A control method comprising the steps of:

generating a plurality of tracking error signals by different processes based on a detection signal; and selecting a tracking error signal corresponding to an operation mode from the plurality of tracking error signals, thereby performing a control operation based on the selected tracking error signal, wherein the plurality of tracking error signals include at least a first tracking error signal obtained by amplifying a peak value of the detection signal and a second tracking error signal obtained by amplifying the detection signal, and further wherein said selecting step selects the first tracking error signal when the operation mode is a seek operation mode, and selects the second tracking error signal when the operation mode is a tracking operation mode.

* * * * *